United States Patent [19]

Zhuber-Okrog et al.

[11] 4,334,898

[45] Jun. 15, 1982

[54] DEVICE FOR THE PRODUCTION OF SOLID ALUMINUM CHLORIDE

[75] Inventors: Gerhard Zhuber-Okrog; Ernst Kowolik, both of Rheinfelden, Fed. Rep. of Germany; Hanspeter Alder, Flurlingen; Hans P. Mueller, Magden, both of Switzerland

[73] Assignee: Swiss Aluminium Ltd., Chippis, Switzerland

[21] Appl. No.: 117,849

[22] Filed: Feb. 4, 1980

[30] Foreign Application Priority Data

Feb. 16, 1979 [CH] Switzerland ............... 1510/79

[51] Int. Cl.³ .................. B01D 59/08; B01D 7/02; F16K 15/04
[52] U.S. Cl. ........................... 55/269; 55/82; 55/99; 55/474; 55/479; 23/294 R; 423/DIG. 16; 239/118; 239/381; 34/57 R; 34/85; 422/143; 422/311
[58] Field of Search ............ 55/82, 99, 269, 474, 55/479; 23/294 R; 422/143, 244, 311; 423/495, 496, DIG. 16; 261/64 R; 34/57 R, 57 A, 85; 239/118, 381, 389; 209/486; 427/213; 75/130 BB

[56] References Cited

U.S. PATENT DOCUMENTS

| | | | |
|---|---|---|---|
| 2,607,440 | 8/1952 | Lewis | 55/82 |
| 3,672,577 | 6/1972 | Kramer | 422/143 |
| 3,921,663 | 11/1975 | Beranek et al. | 34/57 A |
| 3,952,022 | 4/1976 | Becuwe | 23/294 R |
| 4,062,656 | 12/1977 | Blaser et al. | 422/143 |
| 4,070,448 | 1/1978 | Jacobs et al. | 55/82 |

FOREIGN PATENT DOCUMENTS 2335514  2/1975  Fed. Rep. of Germany ... 423/DIG. 16

*Primary Examiner*—David L. Lacey
*Attorney, Agent, or Firm*—Bachman and LaPointe

[57] ABSTRACT

A device for producing solid aluminum chloride from gas containing gaseous aluminum chloride by means of a fluidized bed condenser. Between the inlet pipe for carrier gas and an outlet pipe for residual or waste gas there is a distributor plate with openings in the form of nozzles, at least one cooling facility, a feeding facility for the supply of gas containing gaseous aluminum chloride and a facility for drawing off the solid aluminum chloride. The outlet pipe for waste or residual gas is connected to the inlet pipe for carrier gas via a separator which separates out fine particulate aluminum chloride, which is then fed back to the bed to act as nuclei.

20 Claims, 3 Drawing Figures

DEVICE FOR THE PRODUCTION OF SOLID ALUMINUM CHLORIDE

BACKGROUND OF THE INVENTION

The invention relates to a device for producing solid aluminum chloride from gas containing gaseous aluminum chloride by means of a fluidized bed condenser connected up to an inlet pipe for the supply of a carrier gas and an outlet pipe for residual or waste gas, whereby between the inlet and outlet pipes there is a distributor plate with openings, at least one cooling facility, a feed or supply facility for the gas containing the gaseous aluminum chloride, and a facility for drawing off the solid aluminum chloride.

A process for producing solid aluminum chloride from gas containing gaseous aluminum chloride is known whereby the latter desublimates in a self regenerating fluidized bed of aluminum chloride particles. By desublimation is to be understood the direct transformation from the gaseous state to the solid state. The aluminum chloride rich gas also contains carbon dioxide, chloride, phosgene, carbon monoxide, solid and liquid oxy-chlorides and sodium chloride particles as well as solid aluminum oxide and solid carbon. The solid and liquid components are separated in a first stage at 200°-600° C. In a second stage at 150°-250° C. the aluminum chloride rich gas is passed into the fluidized bed. The bed itself is maintained at a temperature below the desublimation temperature, between 30° and 100° C., preferably between 50° and 70° C.

The above process refers to a device which is also known and which comprises a chamber surrounding the fluidized bed, an inlet for the carrier gas to suspend the solid aluminum particles, and a distributor plate to distribute the carrier gas, cooling devices, facilities to introduce the aluminum chloride rich gas and an outlet for removing the aluminum chloride particles from the fluidized bed. The said particles are between 40 and 420 $\mu$m in size and the bulk density of the product is 1.2–1.7 g/cm$^3$. The residual or waste gas from this device is at least partly recirculated and employed as carrier gas for fluidizing the bed.

In practice it has been found that the design of the component for distributing the carrier gas is of fundamental importance. A known form of this component is a tilted or inclined perforated surface which has holes in it to allow the carrier gas through.

This distributor has however been found very disadvantageous in practice. If the gas contains residual aluminum chloride and moisture, the holes in the surface soon become blocked. In the known device there is no facility which, during the recirculation process, precipitates out the fine aluminum chloride particles still present in the residual or waste gas. As part of this residual or waste gas should be used as carrier gas, the fine aluminum chloride particles or the rest of the aluminum chloride vapor dragged through by the carrier gas are lost during recirculation. This represents not only a loss of aluminum chloride but also a loss of condensation nuclei. In spite of this there is generally sufficient aluminum chloride in the residual or waste gas which in the course of time, in the conventional recirculation and re-use of the waste gas as carrier gas, leads to blockage of the holes in the distributor plate and, as this blockage occurs irregularly, results in regions in the unit where the bed is insufficiently fluidized. In addition, the pressure drop of the carrier gas is too small with this plate.

These disadvantages have a considerable effect on the economics of the device.

Furthermore, the known devices offer no possibility to introduce new condensation nuclei to the bed either at the start or during the condensation process.

A further disadvantage is that by having one single facility for removing the condensed aluminum chloride no selective removal according to particle size can be carried out.

It is therefore an object of the invention to develope a device of the above mentioned kind for the recovery of solid aluminum chloride from gas containing gaseous aluminum chloride but not having these disadvantages.

SUMMARY OF THE INVENTION

This object is achieved by way of the invention in that the openings in the distributor plate are in the form of nozzles which have valves.

The nozzle is preferably designed such that it allows a carrier gas flow rate of 20-80 m/sec.

It comprises e.g. a nozzle housing and a nozzle interior which tapers conically to an opening in the under side of the nozzle housing and, in the tapered region there is a moveable object, preferably a ball, to create frictional wear at the nozzle opening. Towards the upper side of the nozzle housing the tapering is effected by a mouthpiece which, if desired, can be removed. This mouthpiece surrounds the mouth of the nozzle, the cross section of the mouth of the nozzle preferably being smaller than the middle of the nozzle housing.

On the upper side of the moveable object or ball, which is preferably made of Teflon, glass, nickel or another inert material, there is a pin which, if desired, is grooved or roughened, and projects into the nozzle mouth which is surrounded by the mouthpiece and grazes at least a part of the interior of the mouth of the nozzle.

This device has the advantage that at a gas flow rate of 20 to 80 m/sec the ball moves around in the interior of the nozzle and the pin scrapes along the inner face of the mouth of the nozzle. This is effective in preventing the deposition of aluminum chloride and at the same time increases the number of condensation nuclei in the fluidized bed.

The recirculation of the waste or residual gas which, in spite of pre-precipitation still contains aluminum chloride, builds a hard crust around the nozzle opening. However this crust is removed mechanically by the described movement of the ball, without the plate having to be cleaned by raising the temperature.

If the aluminum chloride rich gas is turned off, as a rule a certain degree of evaporation of that gas still takes place out of the hot supply system. Although the supply of carrier gas is stopped, this evaporation of the aluminum chloride rich gas cannot be stopped right away. With the device according to the invention the bed can now be put out of service and started up again later without experiencing any problems due to blocked nozzles, as the crust is removed again by the pins there. Furthermore, on shutting down the fluidized bed the ball in the nozzle closes off the opening and prevents the bed material trickling down through the openings.

This distributor plate also has the advantage that the pressure drop across the plate is high (e.g. equal to the pressure of a 500 mm water column at a gas flow rate of 60 m/sec.). This makes possible uniform distribution of gas and therefore uniform fluidizing of the bed.

A further aspect of the invention is that, between the carrier gas supply line and the facility for removing the waste or residual gas, at least one facility for precipitating out solid particles is provided and is connected to the fluidized bed condenser by means of at least one pipe for feeding particulate solids positioned above the distributor plate.

Inserting a precipitator, preferably a cyclone separator, has the great advantage that from the waste or residual gas, comprising, for the greater part, non condensable gas from the carrier gas, but also fine solid aluminum chloride particles dragged out of the fluidized bed, the fine aluminum chloride particles can be separated out and fed back into the fluidized bed. This improves the economics of the device, as there is no elimination of aluminum chloride or nuclei for condensation, and the waste or residual gas is a better carrier gas.

It has been found particularly advantageous if the inlet pipe is connected via a precipitator to the outlet pipe; this way the distributor plate of the invention is supplied with almost completely purified waste or residual gas.

To arrive at a desired composition of grain sizes, the aluminum chloride particles are removed from the bed, usefully via a plurality of outlet facilities fitted on the fluidized bed condenser at different distances from the distribution plate. Experience has shown that the heavier and larger particles remain in the lower part of the bed and can be removed from there; lighter and smaller particles are driven to the upper part of the condenser and can be removed from there.

The provision of an inlet facility has a similar aim, as this allows e.g. a specific particle size of nuclei to be introduced into the fluidized bed. Furthermore, this facility can be used to fill the bed with particulate material before putting the device into service.

Further advantages, features and details of the invention are revealed in the following description of a preferred exemplified embodiment and with the help of the drawings viz.,

DETAILED DESCRIPTION

Figure 1:
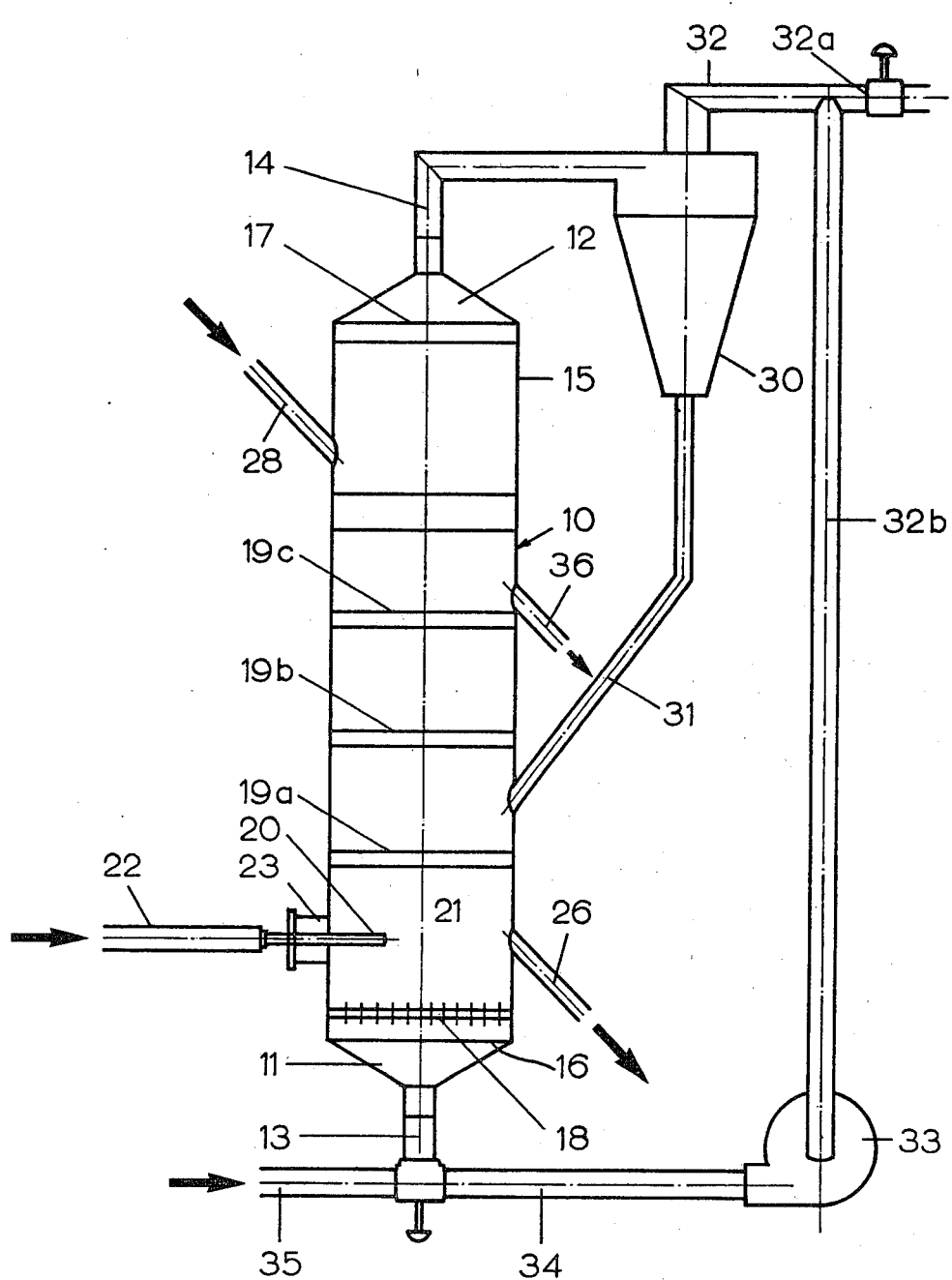
FIG. 1: A schematic cross-sectional view of the fluidized bed condenser.

FIG. 1 shows a fluidized bed condenser 10 comprising an upright cylindrical casing 15 with a top end 17 and a bottom end 16 where the casing 15 tapers to form cones 12 and 11 respectively. A feed pipe 13 for carrier gas is connected to cone 11 and an outlet 14 for waste or residual gas to cone 12.

Inside the casing 15 and above cone 11 and feed pipe 13 there is a distributor plate 18 and, at distances from this, cooling facilities 19a, 19b and 19c.

Between the distributor plate 18 and cooling facility 19a an injection pipe 20 projects through the casing 15 into a fluidized bed 21 and joins up outside the casing 15 to a feed pipe 22 which supplies gaseous aluminum chloride. A heating device 23 is provided around the injection pipe 20.

On the side of the casing 15 opposite the injection pipe 20, also between the distributor plate 18 and the cooling surface 19a, there is a pipe 26 by means of which the aluminum chloride which has condensed in the fluidized bed 21 is removed. A second outlet pipe 36 is provided above the cooling facility 19c. Approximately opposite this outlet 36 there is a feed pipe 28 which penetrates the casing 15 and is for initially filling the fluidized bed condenser 10.

The outlet 14 for the waste or residual gas, which is comprised mainly of non condensable gases, carrier gas and fine aluminum chloride particles, connects up with a separator 30 which separates out the fine particulate aluminum chloride and feeds it again to the fluidized bed condenser 10 via feed pipe 31 between the cooling facilities 19a and 19b. A part of the waste or residual gas which has been purified in the separator 30 is fed via outlet pipe 32 to pipeline 32a which leads to a waste gas purification unit, not shown here. The other part of the waste or residual gas is led off via pipe 32b to a blower 33 for recirculation.

From the blower 33, the gas is led along pipe 34 to inlet pipe 13 for the carrier gas which enters pipe 13 via the pipe 35 coming from a carrier gas source which is not shown here.

Figure 2:
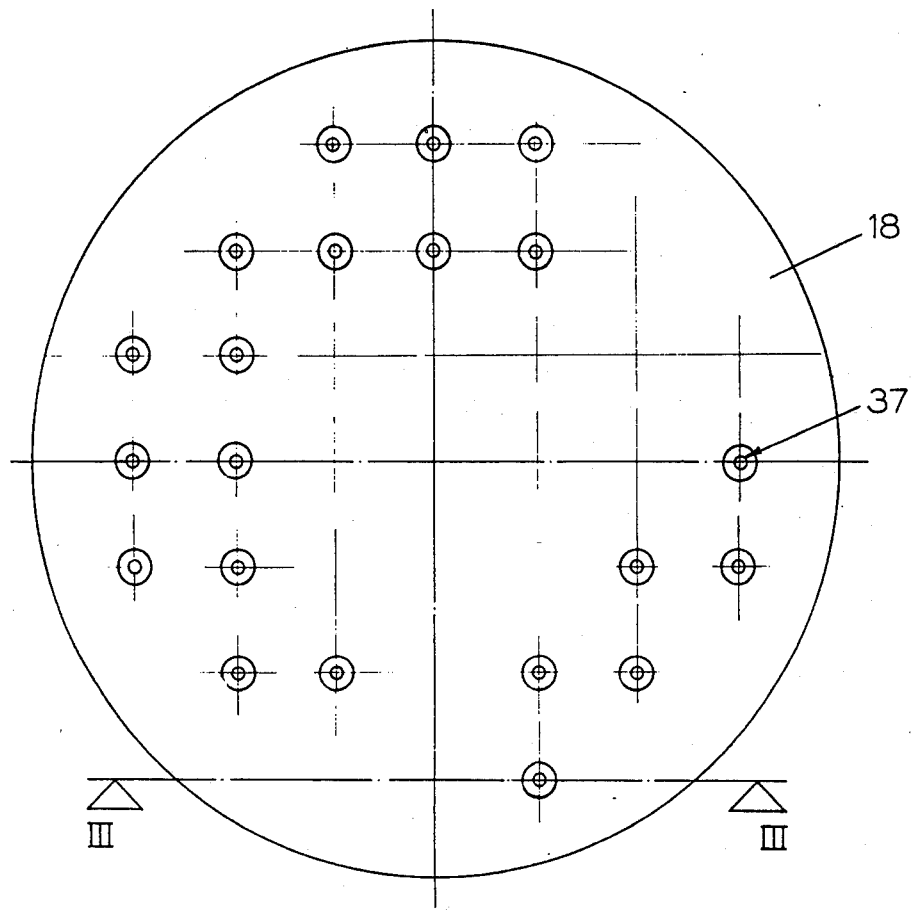
FIG. 2: A plan view of a distributor plate.

As FIG. 2 shows, the distributor plate 18 is fitted with nozzles 37.

Figure 3:
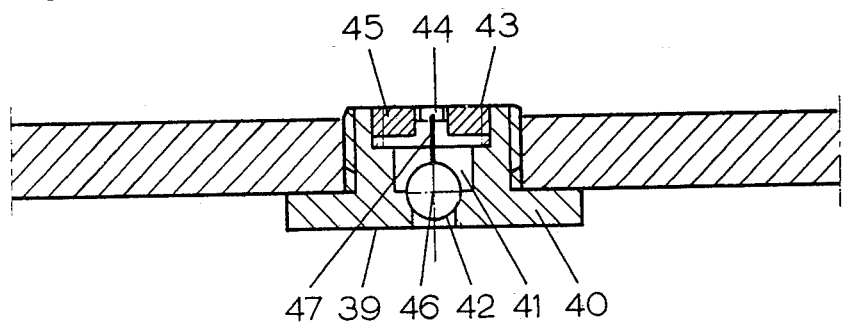
FIG. 3: An enlarged cross-sectional view of the distributor plate, sectioned along line III—III.

The nozzle, shown in FIG. 3, comprises a housing 40 surrounding the nozzle interior 41 which tapers conically towards an opening 42 at the bottom 39 and to the mouth 44 at the upper end 43 of the nozzle. A mouthpiece 45 is provided between the mouth 44 of the nozzle and the nozzle housing 40. In the interior 41 there is a ball 46 with a pin 47 on it on the side facing the mouth 44 of the nozzle and projecting into the mouth 44.

EXAMPLE 1

A condenser, 60 cm internal diameter and 225 cm in overall height, was constructed out of gas cylinders with flanges. Built on top of the carrier gas distributor plate were (from bottom to top) a first cooling unit (0.45 m$^2$ of cooling area) at a height of 52 cm, a second cooling unit (0.59 m$^2$) at a height of 91 cm, a third cooling unit (0.59 m$^2$) at a height of 130 cm and finally a stabilizing space of 0.25 m$^3$.

In the middle, between the distributor plate and the first cooling unit, there is on the one side a facility for feeding gas containing aluminum chloride and on the other side an outlet for removing the condensed aluminum chloride.

In one single throughput 80–130 Nm$^3$/hours of carrier gas (dry air with a dew point of −50° C.) was passed per hour through the distributor plate in the condenser and 10–45 kg/hours of aluminum chloride fed at the same time into the fluidized bed. The temperature of the bed was maintained at 80° C. by circulating oil in cooling coils.

The first condenser plate was a plate perforated by slits 5 mm×20 mm, and had a three layer coating of round corundum particles.

This construction gave a pressure drop of a few millimeters of water column with the above mentioned feed rate of carrier gas. The trials were therefore continued with a second distributor plate which was made out of two layer PTFE felt, each 1.6 mm thick, which had been pressed into the form of a perforated plate. This caused the pressure drop to increase to about 100 mm water column. This degree of pressure drop was necessary to ensure proper distribution of the carrier gas.

Both distributor plates gave satisfactory results only as long as the carrier gas was dry, supplied at a constant rate and at a temperature above 100° C.

In spite of these precautions the pressure drop across the plate rose by about 70% as the plate became encrusted and blocked both from the side facing the bed, due to condensed aluminum chloride, and from the carrier gas supply side, due to traces of moisture which reacted with the aluminum chloride vapor. By increasing the amount of carrier gas and the temperature it was still not possible to keep the passage through the plate free of obstruction.

It is clear that such a distributor plate cannot provide a satisfactory performance in the long term, in particular if, instead of dry air, recirculated carrier gas containing gaseous and solid aluminum chloride is passed through the system.

EXAMPLE 2

The distributor plate according to the invention was installed in the same condenser as described in the first example. This was a steel plate with 37 nozzles uniformly spaced at a distance of 8.7 cm from each other. Each nozzle comprised a housing with an outer diameter of 26 mm, and a PTFE ball which was 10 cm in diameter and featured a steel pin 9 mm in length. The ball sat in a seating in the inlet hole which was 7 mm in diameter.

As in the first example, carrier gas was passed through the distributor plate at a rate of 80–130 Nm$^3$/hours. In contrast to example 1 in which dry air was passed through only once, in this case carrier gas was recycled by a blower after flowing through a cyclone separator. At 100 Nm$^3$/hours the flow rate of the gas in the nozzle was 60 m per second and the pressure drop was about 500 mm of water column.

The unit was operated for 130 hours under the same conditions as in the first example. During the test period, the pressure drop across the plate remained constant, although the temperature of the carrier gas was below 100° C. and the carrier gas contained recirculated gaseous and solid aluminum chloride. No blockage whatever due to aluminum chloride occurred, and on shutting down the unit no aluminum chloride passed down through the nozzle. At various times the supply of gas containing aluminum chloride was interrupted, the bed brought to a halt; each time the unit was restarted without experiencing any difficulties due to crust formation and blockage of the distributor plate.

What is claimed is:

1. Device for producing solid aluminum chloride from gas containing gaseous aluminum chloride comprising a fluidized bed condenser having an inlet pipe for the supply of carrier gas and an outlet pipe for waste or residual gas, said condenser including between the inlet and outlet pipes, a distributor plate with openings, at least one cooling facility spaced from said distributor plate between the distributor plate and the outlet pipe, an inlet facility communicating with said fluidized bed condenser for the supply of gas containing gaseous aluminum chloride and an outlet facility communicating with said fluidized bed condenser for removing solid aluminum chloride, wherein openings in the distributor plate are in the form of nozzles which are provided with valves constructed and arranged to close said openings when the carrier gas supply is off, and wherein said valves include means for removing material encrusting the openings.

2. Device according to claim 1 wherein at least one aditional outlet is provided on the fluidized bed condenser above the outlet facility.

3. Device according to claim 1 wherein on the fluidized bed condenser above the distributor plate there is provided inlet means for feeding solid aluminum chloride particles.

4. Device according to claim 1 in which a feed pipe to said condenser is connected to said inlet facility and to the outlet pipe via a separator conveying purified waste or residual gas to the distributor plate.

5. Device according to claim 4 in which the separator is a cyclonic separator.

6. Device according to claim 1 in which said nozzles are designed such that they permit a carrier gas flow rate of 20–80 m/sec.

7. Device according to claim 1 in which said nozzles comprise a nozzle housing which encloses an interior which tapers in a conical manner to an opening in the bottom of the housing and to the mouth of the nozzle at the top.

8. Device according to claim 7 in which the cross section of the mouth at the top of the nozzle is smaller than at the middle of the nozzle housing.

9. Device according to claim 7 wherein between the mouth and the housing there is a mouthpiece which can be removed.

10. Device according to claim 7 wherein each of said valves include a moveable element in the interior of the nozzle which closes off the opening.

11. Device according to claim 10 wherein said moveable element is a ball.

12. Device according to claim 10 in which the element closing off the opening is made of an inert material.

13. Device according to claim 10 wherein said material removing means comprises a pin mounted on the side of said moveable element facing the mouth of the nozzle.

14. Device according to claim 13 wherein the mouth of the nozzle forms a space in which the pin, which can be raised by the element, can move around, and at the same time graze at least a part of the inner surface of the nozzle mouth.

15. Device according to claim 1 wherein said removing means is a pin connected to each of said valves and moveable with said valves to remove material encrusting said opening.

16. Device for producing solid aluminum chloride from gas containing gaseous aluminum chloride comprising a fluidized bed condenser having an inlet pipe for the supply of carrier gas and an outlet pipe for waste or residual gas, said condenser including between the inlet and outlet pipes, a distributor plate with openings, at least one cooling facility spaced from said distributor plate between the distributor plate and the outlet pipe, an inlet facility communicating with said fluidized bed condenser for the supply of the gas containing gaseous aluminum chloride and an outlet facility communicating with said fluidized bed condenser for removing solid aluminum chloride, the inlet and outlet pipes being connected outside the fluidized bed condenser, wherein between the outlet pipe and the inlet pipe a separator is provided outside the condenser for separating out solid particulate material and is connected to the fluidized bed condenser above the distributor plate via at least one pipe for feeding in said solid particles to the bed and wherein openings in the distributor plate are in the form of nozzles and are provided with valves constructed and arranged to close said openings when the carrier gas supply is off, and wherein said valves include means for removing material encrusting the openings.

17. Device according to claim 16 wherein at least one additional outlet is provided on the fluidized bed condenser above the outlet facility.

18. Device according to claim 16 wherein on the fluidized bed condenser above the distributor plate there is provided inlet means for feeding solid aluminum chloride particles.

19. Device according to claim 18 wherein said inlet means are located above the at least one cooling facility.

20. Device according to claim 16 wherein the separator is a cyclonic separator.

* * * * *